(12) United States Patent
Chaitanya et al.

(10) Patent No.: US 9,600,209 B2
(45) Date of Patent: Mar. 21, 2017

(54) FLASH STORAGE DEVICES AND METHODS FOR ORGANIZING ADDRESS MAPPING TABLES IN FLASH STORAGE DEVICES

(71) Applicant: Samsung Electronics Co., Ltd., Suwon-si, Gyeonggi-do (KR)

(72) Inventors: Kavirayani Venkata Ramakrishna Chaitanya, Bangalore (IN); Santosh Singh, Bangalore (IN); Vikram Singh, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 137 days.

(21) Appl. No.: 14/694,060

(22) Filed: Apr. 23, 2015

(65) Prior Publication Data
US 2015/0363327 A1    Dec. 17, 2015

(30) Foreign Application Priority Data

Jun. 12, 2014    (IN) ............................ 3449/CHE/2013

(51) Int. Cl.
*G06F 12/00*   (2006.01)
*G06F 3/06*    (2006.01)
*G06F 12/02*   (2006.01)

(52) U.S. Cl.
CPC ............ *G06F 3/0679* (2013.01); *G06F 3/064* (2013.01); *G06F 3/0608* (2013.01); *G06F 12/0246* (2013.01); *G06F 2212/1044* (2013.01); *G06F 2212/7201* (2013.01)

(58) Field of Classification Search
CPC .. G06F 3/0679; G06F 12/0246; G06F 3/0608; G06F 2212/7201; G06F 2212/1044
See application file for complete search history.

(56) References Cited

U.S. PATENT DOCUMENTS

| | | | |
|---|---|---|---|
| 7,702,844 B2 | 4/2010 | Chung et al. | |
| 7,969,781 B2 | 6/2011 | Oshima | |
| 8,051,268 B2 | 11/2011 | Nakanishi et al. | |
| 8,180,953 B2 | 5/2012 | Chu | |
| 8,364,931 B2 | 1/2013 | Chiang et al. | |
| 9,298,384 B2* | 3/2016 | Kang | G06F 12/0246 |
| 2010/0125694 A1 | 5/2010 | Choi | |
| 2011/0004720 A1 | 1/2011 | Chiang et al. | |
| 2011/0125955 A1* | 5/2011 | Chen | G06F 12/0246 |
| | | | 711/103 |

(Continued)

*Primary Examiner* — John A Lane
(74) *Attorney, Agent, or Firm* — Harness, Dickey & Pierce, P.L.C.

(57) ABSTRACT

In some example embodiments, a method of organizing an address mapping table of a flash storage device based on Logical Block Address (LBA) size may comprise: identifying an extent of correlation between the LBA and flash page sizes, wherein the extent of correlation indicates greater or lesser extent; computing a total number of entries in each meta page of the table; and/or organizing the table with the total number of entries. In some example embodiments, a method of organizing an address mapping table of a flash storage device based on LBA size may comprise: determining flash page size of the flash storage device; determining the LBA size; and/or comparing the flash page and LBA sizes. When the flash page size is greater, the table may be organized based on flash page size. When the flash page size is less, the table may be organized based on LBA size.

20 Claims, 9 Drawing Sheets

(56) References Cited

U.S. PATENT DOCUMENTS

| | | |
|---|---|---|
| 2013/0246732 A1 | 9/2013 | Seng et al. |
| 2013/0275716 A1 | 10/2013 | Nishida |
| 2015/0106556 A1* | 4/2015 | Yu .................. G11C 16/349 |
| | | 711/103 |
| 2015/0143038 A1* | 5/2015 | Asnaashari ......... G06F 12/0246 |
| | | 711/103 |
| 2016/0117112 A1* | 4/2016 | Tomlin ............... G06F 12/0284 |
| | | 711/103 |

* cited by examiner

| LBA SIZE | PPN |
|---|---|
| 0 | X, X+1, X+2 ...... X+n |
| 1 | Y, Y+1, Y+2 ...... Y+n |
| 2 | Z, Z+1, Z+2 ...... Z+n |
| ⋮ | ⋮ |
| N | ⋮ |

FLASH STORAGE DEVICES AND METHODS FOR ORGANIZING ADDRESS MAPPING TABLES IN FLASH STORAGE DEVICES

CROSS-REFERENCE TO RELATED APPLICATION(S)

This application claims priority from Indian Application No. 3449/CHE/2013, entitled "A Method of Organizing an Address Mapping Table in a Flash Storage Device" filed on Jun. 12, 2014, in the Indian Patent Office (IPO), the entire contents of which are incorporated herein by reference.

BACKGROUND

1. Field

Example embodiments may relate generally to flash storage devices. Example embodiments may relate generally to methods and systems of organizing address mapping tables based on Logical Block Address (LBA) sizes.

2. Description of Related Art

Flash storage devices may be deployed as data storage devices for electronic devices like personal digital assistants (PDAs), Moving Picture Experts Group (MPEG)-1 or MPEG-2 Audio Layer III (MP3) players, cameras, video games, robots, and the like due to their non-volatile nature, faster access speeds, form factor, low power consumption, and the like. The flash storage devices may generally be manufactured using two different logical technologies, namely—Not OR (NOR) flash storage and Not AND (NAND) flash storage. NOR-based flash storage may be commonly used in the Basic Input/Output System (BIOS) programs which run at start up on computing devices. The NAND-based flash storage device may be less expensive than NOR-based flash storage device, and the NAND-based flash storage devices may be capable of read and write operations sequentially at high speed. Further, due to lower cost and higher storage capacity, the NAND flash storage devices may be commonly used in Universal Serial Bus (USB) flash drives, digital cameras, audio and video players, and television (TV) set-top boxes.

NAND-based flash storage devices may use an intermediate Flash Translation Layer (FTL) to communicate between the file system on the host and the flash storage devices. Conventional FTLs may use different approaches like page-level mapping, block-level mapping, and hybrid mapping for mapping a logical page to a corresponding physical NAND-based flash page. In the block-level mapping, the FTL may map each Logical Block Number (LBN) to a Physical Block Number (PBN) in a block mapping table. An update to a page in the block mapping table may lead to erasure of the block containing the corresponding page. Hence, use of the block-level mapping may lead to poor performance, especially during extensive write operations. In page-level mapping, the FTL may map each Logical Page Number (LPN) to a Physical Page Number (PPN) in a page mapping table (PMT). The page-level mapping techniques may allow data to be written to any free page of the flash storage device. Unlike the block-level mapping, which may require constant block erasure, the page-level mapping may allow random write access operations without frequent block erasures.

Although page-level mapping techniques may provide several advantages in comparison to conventional mapping techniques like block-level mapping techniques, page-level mapping techniques may require a significant amount of memory to store the page mapping table. The allocation of excessive memory for the page mapping table may not be viable with the increasing cost-to-performance nature of the flash storage devices.

SUMMARY

Some example embodiments may provide methods and systems to organize address mapping tables in flash storage devices based on Logical Block Address (LBA) sizes.

Some example embodiments may optimize the performance of NAND-based flash storage devices based on the extent of correlation between LBA sizes and NAND page sizes.

Some example embodiments may increase the cache hit ratio and endurance of the flash storage device.

In some example embodiments, a method of organizing an address mapping table of a flash storage device based on a Logical Block Address (LBA) size may comprise: identifying an extent of correlation between the LBA size and a flash page size, wherein the extent of correlation indicates one of greater extent and lesser extent; computing a total number of entries in each meta page of the address mapping table; and/or organizing the address mapping table with the computed total number of entries in each meta page of the address mapping table.

In some example embodiments, the computing of the total number of entries in each meta page of the address mapping table may comprise: calculating an extent value between the LBA size and the flash page size, wherein the extent value indicates one of a number of times the LBA size is greater than the flash page size and a number of times the LBA size is less than the flash page size; determining whether each of the entries in the address mapping table is maintained based on one of the LBA size and the flash page size; and/or computing the total number of entries in each meta page based on one of the page size and a size of each entry in the meta page in response to determining that each of the entries in the address mapping table is maintained based on one of the LBA size and the flash page size.

In some example embodiments, the organizing of the address mapping table with the computed total number of entries in each the meta page of the address mapping table may comprise: calculating a number of meta pages required to store the entries in the address mapping table based on the computed total number of entries in each meta page; and/or allocating memory to store the calculated number of meta pages.

In some example embodiments, data of the LBA size may be stored contiguously in the meta pages.

In some example embodiments, the method may further comprise: maintaining each entry in the address mapping table representing data of the LBA size based on the correlation.

In some example embodiments, the method may further comprise: accessing the organized address mapping table by one of input operation and output operation.

In some example embodiments, the accessing of the organized address mapping table by one of the input operation and output operation may comprise: identifying an entry representing data associated with one of the input operation and output operation, wherein the entry is identified among the number of entries; and/or computing a number of pages to access the data based on a size of each entry in the address mapping table and the flash page size.

In some example embodiments, a flash storage device for organizing an address mapping table based on a Logical Block Address (LBA) size may comprise: a plurality of flash arrays that store data; and/or a controller configured to: identify an extent of correlation between the LBA size and a flash page size, wherein the extent of correlation indicates one of greater extent and lesser extent; compute a total number of entries in each meta page of the address mapping table; and/or organize the address mapping table with the computed total number of the entries in each meta page of the address mapping table.

In some example embodiments, the controller may be further configured to compute the total number of entries in each meta page of the address mapping table LBA size by: calculating an extent value between the LBA size and the flash page size, wherein the extent value indicates one of a number of times the LBA size is greater than the flash page size and a number of times the LBA size is less than the flash page size; determining whether each of the entries in the address mapping table is maintained based on one of the LBA size and the flash page size; and/or computing the total number of entries in each meta page based on one of the page size and a size of each of the entries in the meta page in response to determining that each of the entries in the address mapping table is maintained based on one of the LBA size and the flash page size.

In some example embodiments, the controller may be further configured to organize the address mapping table with the computed total number of entries in each meta page of the address mapping table by: calculating a number of meta pages required to store the entries in the address mapping table based on the computed total number of entries in each meta page; and/or allocating memory to store the calculated number of meta pages.

In some example embodiments, data of the LBA size may be stored contiguously in the meta pages.

In some example embodiments, the controller may be further configured to maintain each entry in the address mapping table representing data of the LBA size based on the correlation.

In some example embodiments, the controller may be further configured to: access the organized address mapping table by one of input operation and output operation.

In some example embodiments, the controller may be further configured to access the organized address mapping table by one of the input operation and output operation by: identifying an entry representing data associated with one of the input operation and output operation, wherein the entry is identified among the number of entries; and/or computing a number of pages to access the data based on a size of each entry in the address mapping table and the flash page size.

In some example embodiments, a method of organizing an address mapping table of a flash storage device based on a Logical Block Address (LBA) size may comprise: determining a flash page size of the flash storage device; determining the LBA size; and/or comparing the flash page size to the LBA size. When the flash page size is greater than the LBA size, the address mapping table may be organized based on the flash page size. When the flash page size is less than the LBA size, the address mapping table may be organized based on the LBA size.

In some example embodiments, data in groups of the LBA size may be stored contiguously in meta pages of the address mapping table.

In some example embodiments, the method may further comprise: accessing the organized address mapping table by input operation.

In some example embodiments, the accessing of the organized address mapping table by the input operation may comprise: identifying an entry representing data associated with the input operation. The entry may be identified among a number of entries in the address mapping table.

In some example embodiments, the accessing of the organized address mapping table by the input operation may further comprise: computing a number of pages to access the data based on a size of the entries in the address mapping table and the flash page size.

In some example embodiments, the method may further comprise: accessing the organized address mapping table by output operation.

In some example embodiments, the accessing of the organized address mapping table by the output operation may comprise: identifying an entry representing data associated with the output operation. The entry may be identified among a number of entries in the address mapping table.

In some example embodiments, the accessing of the organized address mapping table by the output operation may further comprise: computing a number of pages to access the data based on a size of the entries in the address mapping table and the flash page size.

In some example embodiments, the flash page size may be 2 kilobytes (2 KB), 4 KB, 8 KB, or 16 KB.

In some example embodiments, the LBA size may be 4 kilobytes (4 KB), 8 KB, 16 KB, 32 KB, or 64 KB.

In some example embodiments, the comparing of the flash page size to the LBA size may comprise: determining a ratio of the LBA size to the flash page size.

In some example embodiments, a ratio of the LBA size to the flash page size may be 2:1.

In some example embodiments, a ratio of the LBA size to the flash page size may be 4:1.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made to example embodiments, which are illustrated in the accompanying drawings, wherein like reference numerals may refer to like components throughout.

The embodiments disclosed here provide a method of organizing an address mapping table of a flash storage device based on a Logical Block Address (LBA) size. The method includes identifying the extent of correlation between the LBA size and a flash page size. The method includes calculating an extent value between the LBA size and the flash page size. The extent value indicates the relationship between the LBA size and the flash page size. The extent value indicates if the LBA size is greater than the flash page size or if the LBA size is less than the flash page size. The method includes determining if the entries in the address mapping table are based on LBA size or flash page size. The method includes computing the total number of entries in each meta page based on one of the page size and size of each entry. The method includes organizing the address mapping table with the computed total number of entries in each meta page of the address mapping table.

Figure 1:
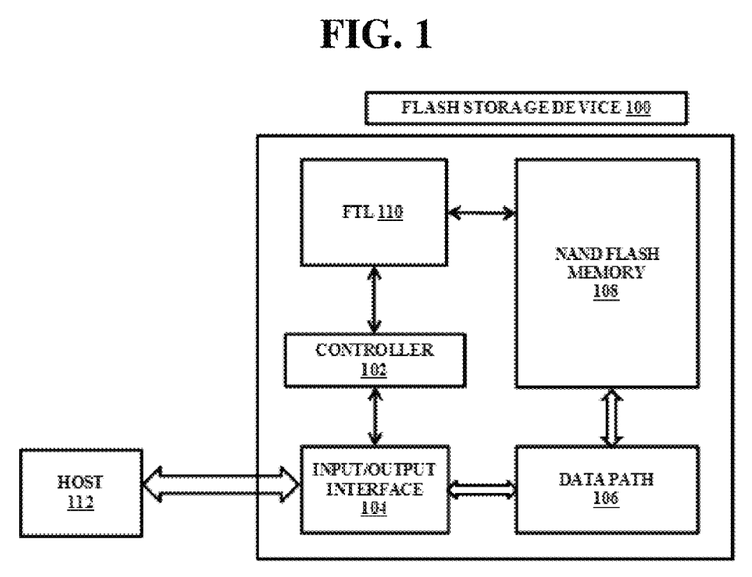
FIG. 1 illustrates an overview of a system according to some example embodiments.

FIG. 1 illustrates an overview of a system, according to some example embodiments. The flash storage device 100 comprises a controller 102, an input/output (I/O) interface 104, a data path 106, a NAND-based flash memory 108, a Flash Transition Layer (FTL) 110, and a host 112. The host 112 communicates with the flash storage device 100 using the input/output interface 104. The NAND-based flash memory 108 comprises of plurality of NAND flash arrays for storing data.

The controller 102 communicates with a software-based FTL 110 for communication with the NAND-based flash memory 108. The FTL 110 presents the NAND flash pages in the form of LBA arrays to the host 112. For example, the FTL 110 can be a driver that works in conjunction with an existing operating system (or, in some embedded applications, as the operating system) to make linear flash memory appear to the system like a disk drive.

The NAND flash arrays can be combined to form blocks, with each block including a plurality of pages. Examples of commonly used NAND-based flash page sizes can include, but are not limited to 2 kilobytes (2 KB), 4 KB, 8 KB, 16 KB, and the like. The NAND-based flash memory 108 has a fixed number of blocks and each block can include a maximum of 256 pages. The controller 102 maintains an address mapping table (not shown in FIG. 1) using the FTL 110. The address mapping table allows the controller 102 to translate the Logical Block Addresses (LBAs) from the host 112 into physical page addresses (PPAs) in the physical NAND-based flash memory 108. This mapping information is maintained in the address mapping table.

The data on each physical flash page includes a corresponding entry in the address mapping table. The number of entries is based on the entry size and the flash page size. For example, if each entry in the address mapping table takes 4 bytes and the flash page size is 8 KB, then 2048 entries can be stored in the flash page size. The flash pages storing data about the entries in the address mapping table may be referred to as "meta pages". The address mapping table is stored in the random-access memory (RAM) of the flash storage device 100 for speed of access. When the flash storage device 100 powers up, the address mapping table is read from the last saved version and reconstructed into the RAM of the flash storage device. In some example embodiments, part of the entries of the address mapping table is maintained in an on-flash static random-access memory (SRAM)-based cache and the remaining entries are maintained in the meta pages. The data path 106 is used for communicating the input/output operation between the NAND-based flash memory 108 and the host 112. The data path 106 comprise of circuitry which allows switching between an input path and an output path based on the input/output operation.

The host 112 can send the LBA size to be used by the controller 102 using the input/output interface 104. Based on the received LBA size, the controller 102 can be configured to instruct the FTL 110 to format the NAND-based flash memory 108. The host 112 uses a Non-Volatile Memory Express (NVMe) to communicate with the flash storage device 100. The NVMe can be used to define a namespace range for the LBA size. Further, each namespace can have a different LBA size based on the usage of the namespace from the host 112. The namespace range allows the NVMe at the host 112 to format the NAND-based flash memory 108 into logical blocks. A namespace of size 'n' can be a collection of logical blocks with Logical Block Addresses from '0' to '(n−1)'. For example, an LBA size of 16 KB is collection of Logical Block Addresses from 0 to 15. In conventional flash memories, the size of the LBA is defined without considering the flash page size. Examples of commonly used LBA sizes include 512 bytes, 4 KB, 8 KB, 32 KB, and 64 KB. Some example embodiments of the methods may allow the host 112 to identify the extent of correlation between the LBA size and the NAND page size. The extent value can be calculated between the LBA size and the flash page size. The extent value provides a ratio between the LBA size and the flash page size. Further, based on the extent value, the host 112 determines the number of times the LBA size is greater than the flash page size or the number of times said LBA size is less than said flash page size. Based on the extent value the organization of the address mapping table can be modified.

Case 1—LBA Size Greater than Flash Page Size

In case the LBA size is greater than the NAND page size, multiple physical pages can be mapped to a single logical block sent by the host 112. The extent value determines the number of pages which can be associated with a single LBA. The controller 102 can be configured to format the LBA size based on the determined extent value. Consider an example, when the LBA size is 64 KB and the flash page size is 16 KB. The extent value 4 (64 KB/16 KB) can be used to define the number of pages, which can be associated with a single LBA size.

The controller 102 can be configured to organize the address mapping table based on the number of entries in each flash page. The number of entries per page increases based on the extent value. For example, the number of entries in each flash page was 2048 then; the number of entries becomes 4*2048=8192 entries per page. The LBA size is formatted to include 64 KB of meta data. As more entries are associated with single LBA, the access of data through the address mapping table can be faster. The formatted LBA size allows more meta pages to be associated with a single LBA and each meta page store more entries. For example, 64 KB LBA size allows 64 KB of data to be associated with the single LBA. More details on the structure of the address mapping table and number of entries are explained in conjunction with FIG. 2 and FIG. 3. Since the overall meta data size and number of meta pages can be significantly reduced, the number of updates on the meta page reduces. Further, the write performance and endurance of the flash storage device 100 is improved. Experimental results highlighting the write performance and endurance of the flash storage device 100 are presented in FIG. 8 and FIG. 9 of this document.

Case 2—LBA Size Less than NAND Flash Page Size or "LBA Size=NAND Page Size"

In case the LBA size is less than the NAND page size, the page mapping table is maintained based on the NAND page size. For example, if each entry takes 4 bytes, 2048 entries can be stored in a flash page of 8 KB. The controller 102 can be configured to maintain the address mapping table using the flash page size.

It must be understood that the NAND-based flash memory 108 is used as storage in the flash storage device 100.

Figure 2:
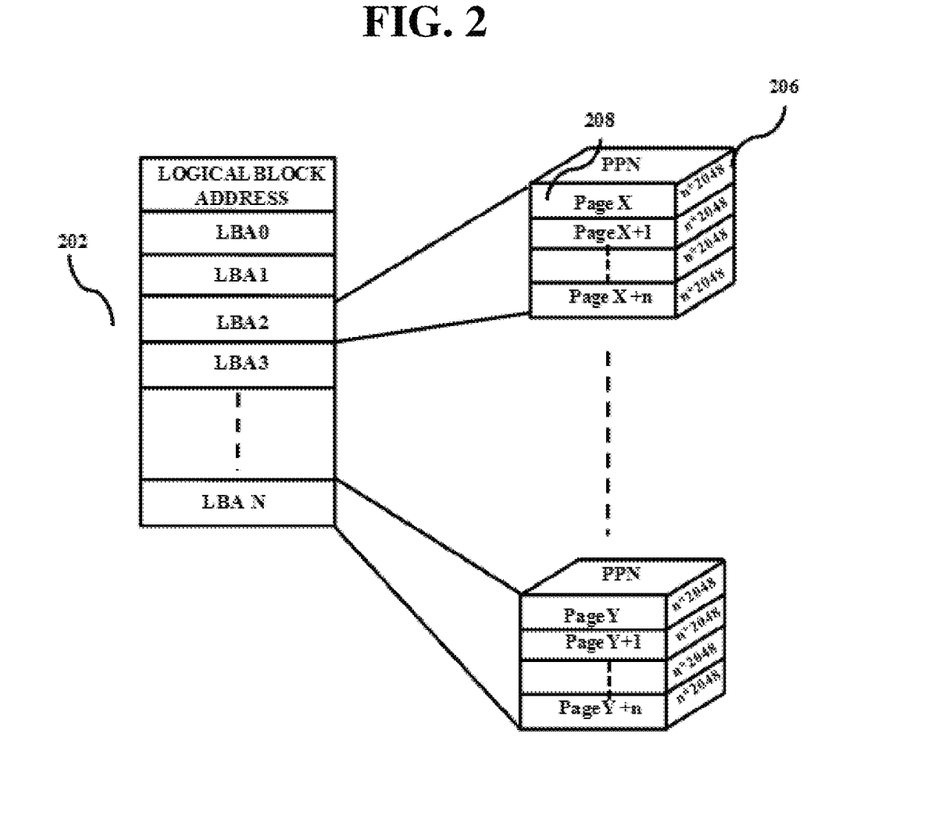
FIG. 2 illustrates a schematic diagram of a Logical Block Address (LBA) according to some example embodiments.

FIG. 2 illustrates a schematic diagram of a Logical Block Address (LBA), according to some example embodiments. The FIG. 2 shows the mapping of flash pages to the LBA, when the LBA size is greater than the flash page size. The LBA is arranged from 1 to N (shown in 202). Each LBA has a specific number of pages of associated with it. For example, the LBA 2 corresponds to pages X, X+1 . . . , X+n. The pages as shown in 208 allow data to be written continuously over the pages X, X+1 . . . , X+n. Further, as the address mapping table is arranged based on the LBA size, the number of entries per page also increases. The number of entries per page increases from 2048 entries to n*2048 as shown in 206. The number 'n' is the extent value calculated between the LBA size and the flash page size.

Figure 3:
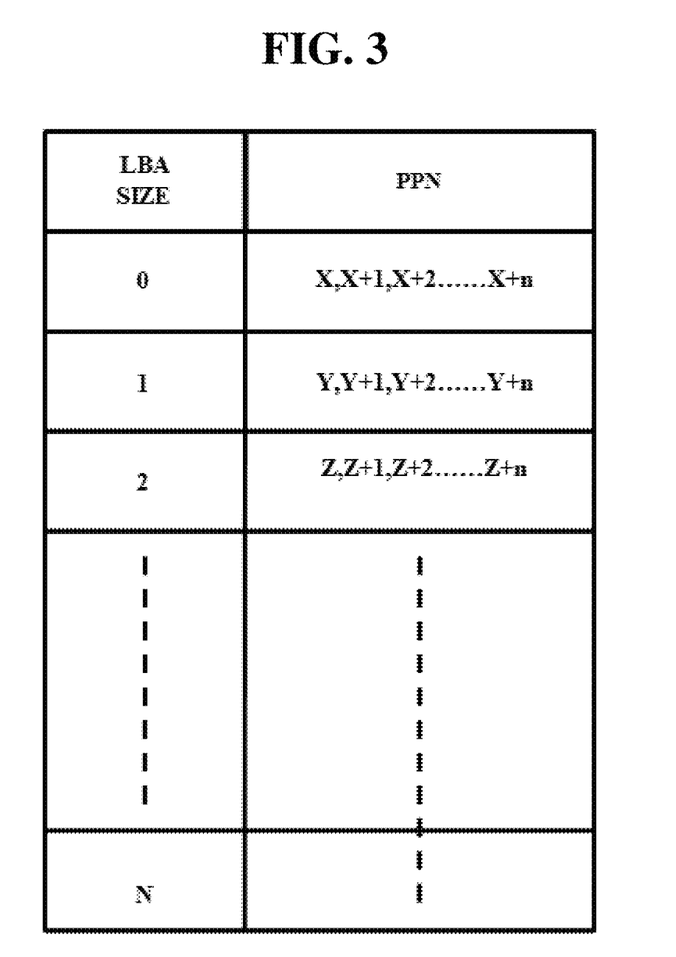
FIG. 3 illustrates a schematic diagram of an address mapping table according to some example embodiments.

FIG. 3 illustrates a schematic diagram of an address mapping table, according to some example embodiments. The address mapping table is arranged based on the LBA size. Each LBA size has physical pages associated with it. The physical pages associated with each LBA size depends on the extent of correlation between the LBA size and the flash page size. The number of entries associated with single LBA size entry increases based on the extent of correlation and the calculated extent value. For example, the LBA size entry 0 corresponds to physical page numbers X, X+1, X+2, X+3 . . . X+n. Each LBA entry has multiple consecutive pages associated with the LBA size.

Figure 4:
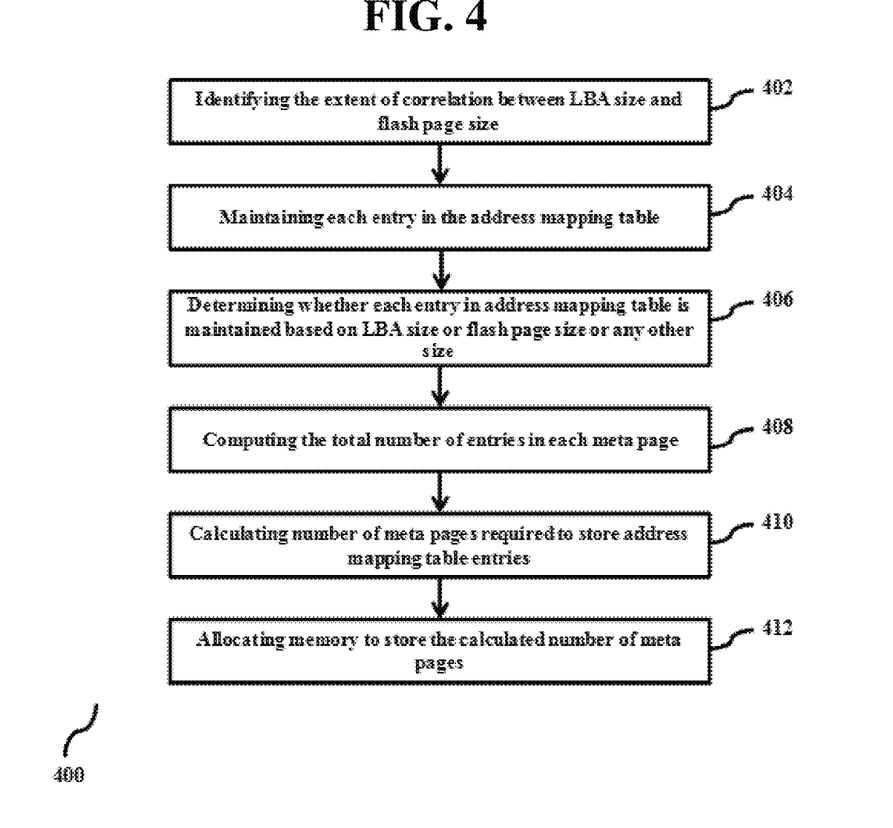
FIG. 4 is a flow diagram illustrating a method of organizing the address mapping table according to some example embodiments.

FIG. 4 is a flow diagram illustrating a method of organizing the address mapping table, according to some example embodiments. The various steps of the method 400 are summarized into individual blocks where some of the steps can be performed by various modules of the flash storage device 100, the controller 102, and the like. The method 400 and other example embodiments described herein provide a basis for a control program, which can be implemented using a microcontroller, microprocessor, or an equivalent thereof.

At step 402, the method 400 includes identifying the extent of correlation between LBA size and flash page size. The extent of correlation can be identified by calculating an extent value between the LBA size and the flash page size. Based on the LBA size sent by the host 112, the method 400 allows the controller 102 to determine the extent of correlation. The extent of correlation can identify a greater extent or a lesser extent. The greater extent corresponds to a scenario when the LBA size is greater than the flash page size. The lesser extent corresponds to a scenario when the LBA size is less than the flash page size. For example, when the LBA size is 16 KB and the flash page is 8 KB, the extent of correlation is given by 2. The LBA size is twice the size of the flash page size. Hence, each LBA size entry can be associated with 2 pages and 2*2048 entries.

At step 404, the method 400 includes maintaining each entry in the address mapping table. The method 400 allows the controller 102 to maintain the address mapping table using the FTL 110.

At step 406, the method 400 includes determining whether each entry in the address mapping table is maintained based on LBA size, flash page size, or any other size. The method 400 allows the controller 102 to identify the mapping technique used in the address mapping table. Further, the controller 102 can be configured to identify the type of mapping technique based on the flash page size and the LBA size.

At step 408, the method includes computing the total number of entries in each meta page based on either the flash page size, the LBA size, or any other size. The number of entries can be calculated based on the address mapping table. In one scenario, if the address mapping table is arranged based on the flash page size, the number of entries can be calculated accordingly. In another scenario, if the address mapping table is arranged based on the LBA size, the number of entries can be calculated accordingly.

At step 410, the method 400 includes calculating number of meta pages required to store address mapping table entries. Based on the calculated number of entries and the flash page size, the number of meta pages (flash pages storing mapping information) can be calculated by the controller 102.

At step 412, the method 400 includes allocating memory to store the calculated number of meta pages. The method 400 allows the controller 102 to allocate memory required for the calculated entries. As the number of entries associated with each LBA size entry is increased, the number of meta pages required to store the address mapping table is reduced. Hence the memory allocated to store the calculated entries is reduced by a factor of the extent of correlation between the LBA size and the flash page size.

The various actions, acts, blocks, steps, and the like in method 400 may be performed in the order presented, in a different order, or simultaneously. Further, in some example embodiments, some actions, acts, blocks, steps, and the like may be omitted, added, modified, skipped, and the like without departing from the scope of the invention.

Figure 5:
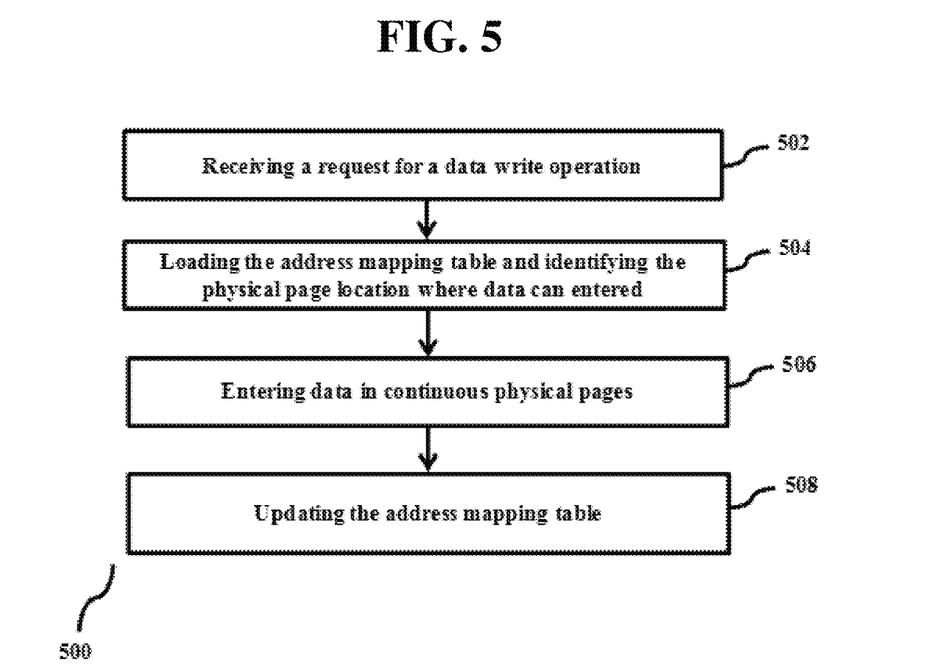
FIG. 5 is a flow diagram illustrating a method of writing data in the flash storage device using the address mapping table according to some example embodiments.

FIG. 5 is a flow diagram illustrating a method of writing data in the flash storage device using the address mapping table, according to some example embodiments. The various steps of the method 500 are summarized into individual blocks where some of the steps can be performed by various modules of the flash storage device 100, the controller 102, and the like. The method 500 and other example embodiments described herein provide a basis for a control program, which can be implemented using a microcontroller, microprocessor, or an equivalent thereof.

At step 502, the method 500 includes receiving a request for a data write operation. The controller 102 receives the write operation request from the host 112. At step 504, the method 500 includes loading the address mapping table and identifying the physical page location where data can be entered. The method 500 allows the controller 102 to load the address mapping table to its cache memory for identifying the physical pages where the data can be written. At step 506, the method 500 includes entering the data in continuous physical pages. In cases where the address mapping table is arranged based on the LBA size, data is written in consecutive physical pages and corresponding write operations are associated with the same LBA entry. At step 508, the method 500 includes updating the address mapping table. Based on the data entered corresponding meta data entry is created and updated in the address mapping table.

The various actions, acts, blocks, steps, and the like in method 500 may be performed in the order presented, in a different order, or simultaneously. Further, in some example embodiments, some actions, acts, blocks, steps, and the like may be omitted, added, modified, skipped, and the like without departing from the scope of the invention.

Figure 6:
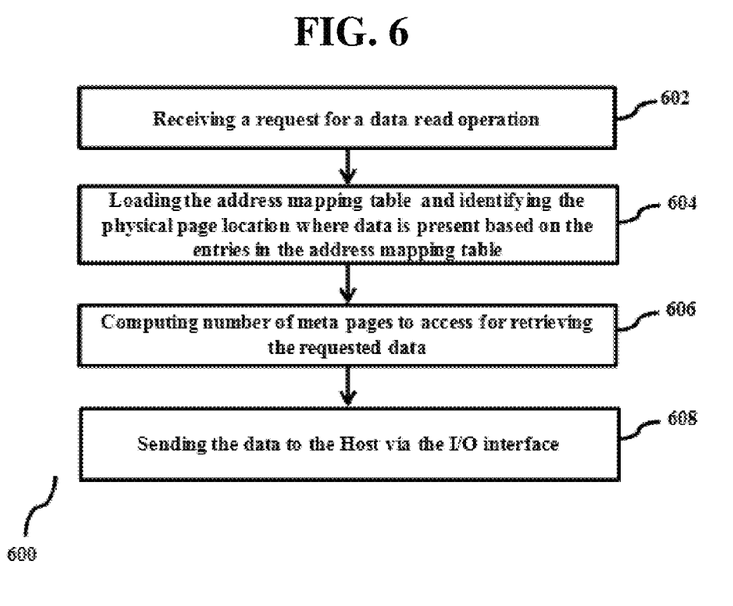
FIG. 6 is flow chart illustrating a method of reading data from the flash storage device using the address mapping table according to some example embodiments.

FIG. 6 is flow chart illustrating a method of reading data from the flash memory using the address mapping table, according to some example embodiments. The various steps of the method 600 are summarized into individual blocks where some of the steps can be performed by various modules of the flash storage device 100, the controller 102, and the like. The method 600 and other example embodiments described herein provide a basis for a control program, which can be implemented using a microcontroller, microprocessor, or an equivalent thereof.

At step 602, the method 600 includes receiving a request for a data read operation. The controller 102 receives the read operation request from the host 112. At step 604, the method 600 includes loading the address mapping table and identifying the physical page location where data is present based on the entries in the address mapping table. The method 600 allows the controller 102 to load the address mapping table to its cache memory for identifying the physical pages from which data can be read. At step 606, the method 600 includes computing the number of meta pages to access for retrieving the requested data. If the address mapping table is arranged based on the LBA size, then the data is read from consecutive physical pages and corresponding read operations are associated with the same LBA entry. Hence, the data can be retrieved at faster speeds. At step 608, the method 600 includes sending the data to the host 112 via the I/O interface.

The various actions, acts, blocks, steps, and the like in method 600 may be performed in the order presented, in a different order, or simultaneously. Further, in some example embodiments, some actions, acts, blocks, steps, and the like may be omitted, added, modified, skipped, and the like without departing from the scope of the invention.

Although method 500 and 600 describe the write and read operations performed in the flash storage device 100, it must be understood that an erase operation can also be performed using steps described in method 500 and method 600.

Figure 7:
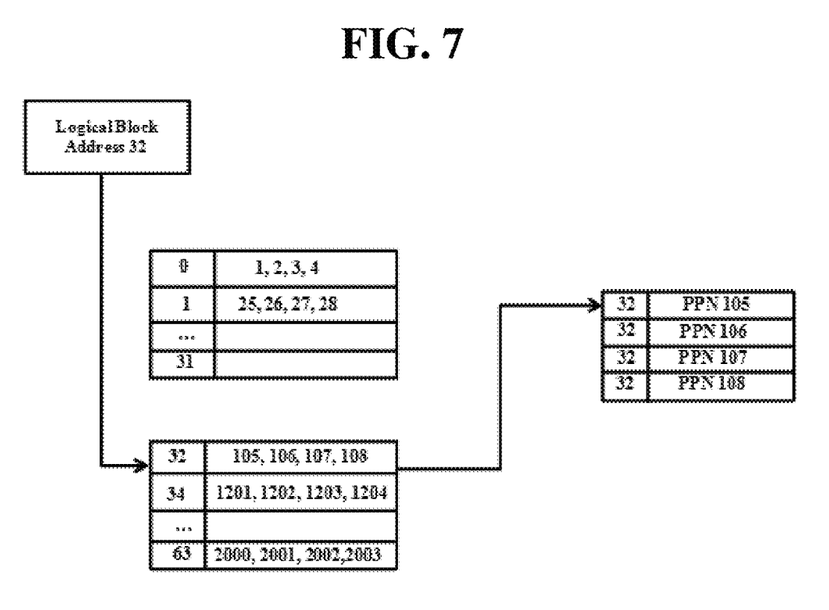
FIG. 7 illustrates a schematic diagram of an input/output operation being processed according to some example embodiments.

FIG. 7 illustrates a schematic diagram of the mapping process, according to some example embodiments. When data from Logical Block Address entry 32 is required, the controller 102 can load the address mapping table in the cache memory. In the address mapping table, the LBA entry 32 contains the page numbers 105, 106, 107, and 108, respectively. Each LBA entry has multiple pages of data associated with it and can be stored continuously over the associated pages. Further, accessing of data also becomes easier.

Cache Hit Ratio

In conventional address mapping tables, there is a latency caused by frequent page mapping table (PMT) updates resulting in multiple erases, which reduces the endurance of the flash storage device.

Consider an example where,
The data program time=Tprog
PMT update time=Tprog+Tread (1 page write+1 page read)
The Cache hit ratio=Chit
Write time TW=Tprog+(1−Chit)*(Tprog+Tread)

Endurance is inversely proportional to the erase count, the number of hits.

Further, the endurance is directly proportional to the number of entries in the PMT table and the cache hit ratio.

The complete input/output operation cycle from the host 112 to the flash storage device 100 increases due to formatted LBA size accommodating more entries.

Calculation and Experimental Results

For comparing the performance of a conventional page mapping table and the address mapping table of the example embodiments, the address mapping table of the example embodiments identifies the extent of correlation between the LBA size and NAND size to arrange the physical pages.

Let $T_{prog}=3*T_{read}$ (industry standard)
LBA size=n*NAND page size.

Let's assume $C_{hit}$=0.2 (e.g., 30% cache hits occur for a particular work load).

In conventional page mapping tables:

$$T_w^1 = 3*T_{read} + (1-C_{hit})*(3*T_{read}+T_{read})$$
$$= (7-4*C_{hit})*T_{read}$$

Endurance $\alpha$ $C_{hit}$

Endurance = $k1*C_{hit}$

In the methods of the example embodiments, the number of entries per meta page is 'n' times the number of entries in the conventional page mapping table. Hence, the cache hit ratio can be increased proportional to 'n'.

e.g., $C_{hit}$(New method) = $k*n*C_{hit}$ $$T_w^2 = 3*T_{read} + (1-C_{hit})*(3*T_{read}+T_{read})$$
$$= (7-4*k*n*C_{hit})*T_{read}$$

Endurance = $k1*k*n*C_{hit}$

'k' is a proportional constant that varies with 'n'.

| k = 1 | if n = 1 |
| k < 1 & k > 0.5 | if n > 1 |

The programming time to write (conventional method/methods of the example embodiments)
Programming time to write $$= \frac{T_w^2}{T_w^1} = \frac{(7-4*k*n*C_{hit})}{(7-4*C_{hit})}$$

Assume $k = 0.7$ $$= \frac{T_w^2}{T_w^1} = \frac{(7-4*0.7*n*0.2)}{(7-4*0.2)} = \frac{(7-0.56*n)}{6.2}$$

So write performance $$= \frac{T_w^1}{T_w^2} = \frac{6.2}{(7-0.56*n)}$$

Figure 8:
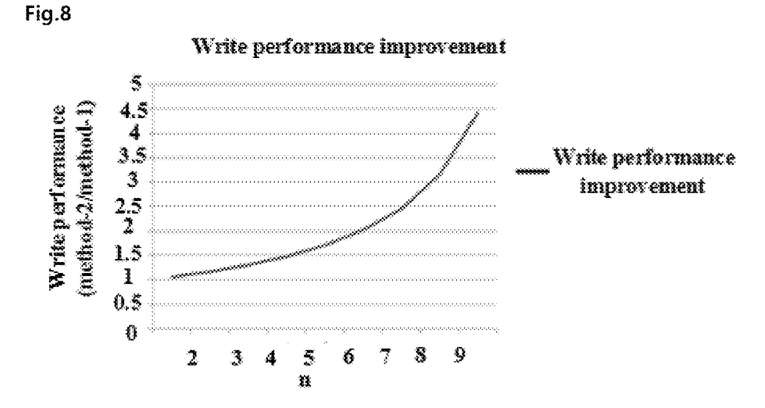
FIG. 8 is a graph showing the improvement in the write operation of the flash storage device over page level mapping techniques according to some example embodiments.

FIG. 8 is a graph showing the improvement in the write operation of the flash storage device over page level mapping techniques, according to some example embodiments. The random write performance improved with increase in the LBA size. With increase in 'n', each meta page can store more number of entries and hence, a higher performance can be achieved.

Figure 9:
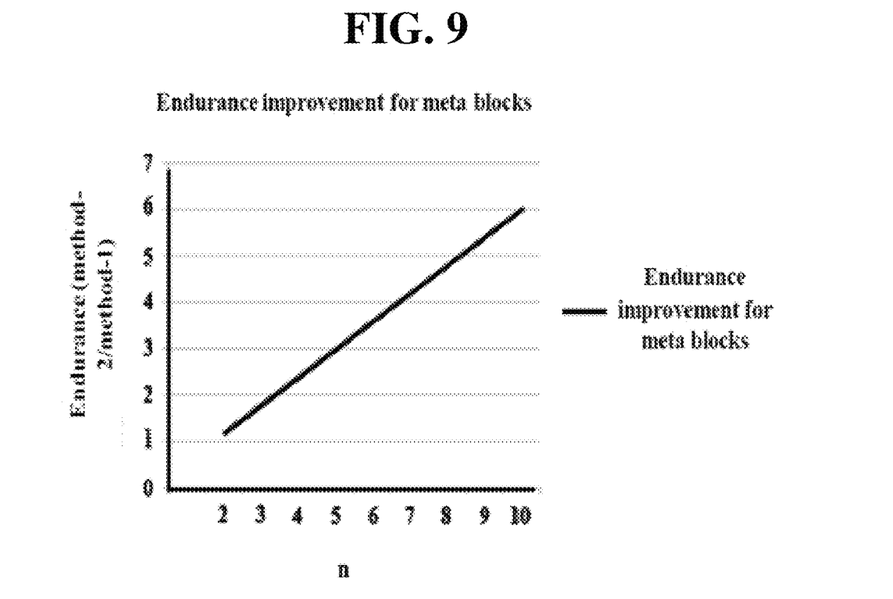
FIG. 9 is a graph showing improvement in the endurance of the flash storage device over page level mapping techniques according to some example embodiments.

FIG. 9 is a graph showing improvement in the endurance of the flash storage device over page level mapping techniques, according to some example embodiments.

The endurance performance comparison is as below:

$$\frac{\text{Endurance}(method2)}{\text{Endurance}(method1)} = \frac{k1*k*n*C_{hit}}{k1*C_{hit}} = k*n = 0.6*n$$

The endurance of the flash storage device increased with increasing extent of correlation 'n' between the LBA size and NAND size. The life time of the meta block/pages can be improved by improving the cache hit ratio.

Some example embodiments disclosed herein can be implemented through at least one software program running on at least one hardware device and performing network management functions to control the elements. The elements shown in FIGS. 1, 2, and 6 include blocks which can be at least one of a hardware device, or a combination of hardware device(s) and software module(s).

The algorithms discussed in this application (e.g., for organizing address mapping tables, for writing data, and for reading data) may be used in more general purpose apparatuses and/or methods. For example, the algorithms may be used in apparatuses and methods for more general electrical or electronic systems (e.g., for organizing data, for writing data, and for reading data).

The methods described above may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiment, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by those skilled in the art that changes may be made in these example embodiments without departing from the principles and spirit of the disclosure, the scope of which is defined by the claims and their equivalents.

That which is claimed:

1. A method of organizing an address mapping table of a flash storage device based on a Logical Block Address (LBA) size, the method comprising:
   identifying an extent of correlation between the LBA size and a flash page size, wherein the extent of correlation indicates one of greater extent and lesser extent;
   computing a total number of entries in each meta page of the address mapping table; and
   organizing the address mapping table with the computed total number of entries in each meta page of the address mapping table.

2. The method of claim 1, wherein the computing of the total number of entries in each meta page of the address mapping table comprises:
   calculating an extent value between the LBA size and the flash page size, wherein the extent value indicates one of a number of times the LBA size is greater than the flash page size and a number of times the LBA size is less than the flash page size;
   determining whether each of the entries in the address mapping table is maintained based on one of the LBA size and the flash page size; and
   computing the total number of entries in each meta page based on one of the page size and a size of each entry in the meta page in response to determining that each of the entries in the address mapping table is maintained based on one of the LBA size and the flash page size.

3. The method of claim 1, wherein the organizing of the address mapping table with the computed total number of entries in each the meta page of the address mapping table comprises:
   calculating a number of meta pages required to store the entries in the address mapping table based on the computed total number of entries in each meta page; and
   allocating memory to store the calculated number of meta pages.

4. The method of claim 1, wherein data of the LBA size is stored contiguously in the meta pages.

5. The method of claim 1, further comprising:
   maintaining each entry in the address mapping table representing data of the LBA size based on the correlation.

6. The method of claim 1, further comprising:
   accessing the organized address mapping table by one of input operation and output operation.

7. The method of claim 6, wherein the accessing of the organized address mapping table by one of the input operation and output operation comprises:
   identifying an entry representing data associated with one of the input operation and output operation, wherein the entry is identified among the number of entries; and computing a number of pages to access the data based on a size of each entry in the address mapping table and the flash page size.

8. A flash storage device for organizing an address mapping table based on a Logical Block Address (LBA) size, the flash storage device comprising:
a plurality of flash arrays that store data; and
a controller configured to:
identify an extent of correlation between the LBA size and a flash page size, wherein the extent of correlation indicates one of greater extent and lesser extent;
compute a total number of entries in each meta page of the address mapping table; and
organize the address mapping table with the computed total number of the entries in each meta page of the address mapping table.

9. The flash storage device of claim 8, wherein the controller is further configured to compute the total number of entries in each meta page of the address mapping table LBA size by:
calculating an extent value between the LBA size and the flash page size, wherein the extent value indicates one of a number of times the LBA size is greater than the flash page size and a number of times the LBA size is less than the flash page size;
determining whether each of the entries in the address mapping table is maintained based on one of the LBA size and the flash page size; and
computing the total number of entries in each meta page based on one of the page size and a size of each of the entries in the meta page in response to determining that each of the entries in the address mapping table is maintained based on one of the LBA size and the flash page size.

10. The flash storage device of claim 8, wherein the controller is further configured to organize the address mapping table with the computed total number of entries in each meta page of the address mapping table by:
calculating a number of meta pages required to store the entries in the address mapping table based on the computed total number of entries in each meta page; and
allocating memory to store the calculated number of meta pages.

11. The flash storage device of claim 8, wherein data of the LBA size is stored contiguously in the meta pages.

12. The flash storage device of claim 8, wherein the controller is further configured to maintain each entry in the address mapping table representing data of the LBA size based on the correlation.

13. The flash storage device of claim 8, the controller is further configured to:
access the organized address mapping table by one of input operation and output operation.

14. The flash storage device of claim 13, wherein the controller is further configured to access the organized address mapping table by one of the input operation and output operation by:
identifying an entry representing data associated with one of the input operation and output operation, wherein the entry is identified among the number of entries; and
computing a number of pages to access the data based on a size of each entry in the address mapping table and the flash page size.

15. A method of organizing an address mapping table of a flash storage device based on a Logical Block Address (LBA) size, the method comprising:
determining a flash page size of the flash storage device;
determining the LBA size; and
comparing the flash page size to the LBA size;
wherein when the flash page size is greater than the LBA size, the address mapping table is organized based on the flash page size, and
wherein when the flash page size is less than the LBA size, the address mapping table is organized based on the LBA size.

16. The method of claim 15, wherein data in groups of the LBA size is stored contiguously in meta pages of the address mapping table.

17. The method of claim 15, further comprising:
accessing the organized address mapping table by input operation.

18. The method of claim 17, wherein the accessing of the organized address mapping table by the input operation comprises:
identifying an entry representing data associated with the input operation;
wherein the entry is identified among a number of entries in the address mapping table.

19. The method of claim 18, wherein the accessing of the organized address mapping table by the input operation further comprises:
computing a number of pages to access the data based on a size of the entries in the address mapping table and the flash page size.

20. The method of claim 15, further comprising:
accessing the organized address mapping table by output operation.

* * * * *